(12) United States Patent
Imaoka et al.

(10) Patent No.: US 10,021,397 B2
(45) Date of Patent: Jul. 10, 2018

(54) SEMICONDUCTOR DEVICE

(71) Applicant: RENESAS ELECTRONICS CORPORATION, Tokyo (JP)

(72) Inventors: Ren Imaoka, Tokyo (JP); Seiji Mochizuki, Tokyo (JP); Toshiyuki Kaya, Tokyo (JP); Kazushi Akie, Tokyo (JP); Ryoji Hashimoto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 92 days.

(21) Appl. No.: 15/266,528

(22) Filed: Sep. 15, 2016

(65) Prior Publication Data
US 2017/0094280 A1 Mar. 30, 2017

(30) Foreign Application Priority Data
Sep. 28, 2015 (JP) ................................. 2015-189671

(51) Int. Cl.
*H04N 19/139* (2014.01)
*H04N 7/167* (2011.01)
(Continued)

(52) U.S. Cl.
CPC ......... *H04N 19/139* (2014.11); *H04N 19/105* (2014.11); *H04N 19/124* (2014.11); *H04N 19/132* (2014.11); *H04N 19/137* (2014.11); *H04N 19/159* (2014.11); *H04N 19/172* (2014.11); *H04N 19/439* (2014.11); *H04N 19/61* (2014.11); *H04N 19/174* (2014.11); *H04N 19/186* (2014.11)

(58) Field of Classification Search
CPC .. H04N 19/105; H04N 19/124; H04N 19/132; H04N 19/137; H04N 19/139; H04N 19/159; H04N 19/172; H04N 19/174; H04N 19/186; H04N 19/439; H04N 19/61
USPC ................ 375/240.17; 380/28, 200; 713/182
See application file for complete search history.

(56) References Cited

U.S. PATENT DOCUMENTS 7,373,506 B2 * 5/2008 Asano ..................... G06F 21/10
380/200
8,973,152 B2 * 3/2015 Lee ........................ G07C 5/085
380/37
(Continued)

FOREIGN PATENT DOCUMENTS

JP     2015-002371 A    1/2015

*Primary Examiner* — Shan E Elahi
(74) *Attorney, Agent, or Firm* — McDermott Will & Emery LLP

(57) ABSTRACT

A semiconductor device includes a hash generator, a reference hash list, a frame mode determination unit, and an intra prediction unit. The hash generator generates a hash value of a target frame to be encoded. The reference hash list is to record the hash value generated by the hash generator. The frame mode determination unit compares the hash value generated by the hash generator and the hash value in the reference hash list. The intra prediction unit performs intra prediction for the target frame to be encoded. When the hash value of the target frame to be encoded coincides with any of the hash values in the reference hash list, the intra prediction unit skips an encoding process, and outputs encoded information corresponding to any of the hash values in the reference hash list.

15 Claims, 16 Drawing Sheets

(51) Int. Cl.
*H04N 19/105* (2014.01)
*H04N 19/124* (2014.01)
*H04N 19/159* (2014.01)
*H04N 19/172* (2014.01)
*H04N 19/42* (2014.01)
*H04N 19/61* (2014.01)
*H04N 19/132* (2014.01)
*H04N 19/137* (2014.01)
H04N 19/174 (2014.01)
H04N 19/186 (2014.01)

(56) References Cited

U.S. PATENT DOCUMENTS

| | | | |
|---|---|---|---|
| 2010/0064354 A1* | 3/2010 | Irvine | G06F 21/6218 |
| | | | 726/5 |
| 2010/0088517 A1* | 4/2010 | Piersol | H04L 9/3236 |
| | | | 713/171 |
| 2017/0148014 A1* | 5/2017 | Bouse | G06Q 20/3674 |

* cited by examiner

SEMICONDUCTOR DEVICE

CROSS-REFERENCE TO RELATED APPLICATIONS

The disclosure of Japanese Patent Application No. 2015-189671 filed on Sep. 28, 2015 including the specification, drawings and abstract is incorporated herein by reference in its entirety.

The present disclosure relates to a semiconductor device, and is applicable to, for example, an image encoding apparatus using a hash.

BACKGROUND

A well-known encoding system for compression recording of moving images is H.264/MPEG-4 AVC (hereinafter referred to as H.264). In H.264, to improve the encoding efficiency, possible systems are intra-frame prediction encoding (hereinafter referred to as "intra prediction") and inter-frame prediction encoding (hereinafter referred to as "inter prediction"). The intra prediction is prediction encoding with using the correlation between pixels in a picture. The inter prediction is prediction encoding with using the correlation between pixels between pictures with motion vectors. In the inter prediction, the motion vectors are searched. The motion vectors represent a magnitude of motion from a reference image in the unit blocks to be encoded to a target image to be encoded. The searched motion vectors are encoded similarly to residual prediction for the target image, and multiplexed as a part of an encoded stream output from an image encoding apparatus. The above contents are disclosed in Japanese Unexamined Patent Application Publication No. 2015-2371.

SUMMARY

In the above-described image encoding apparatus, encoding is performed always based on prediction, even when the same images are successively input.

Any other objects and new features will be apparent from the descriptions of the present specification and the accompanying drawings.

Of the present disclosure, brief descriptions of the representative example are as follows.

That is, when a hash value of a target frame to be encoded and a hash value in a reference hash list coincide with each other, in the semiconductor device, an intra prediction unit skips an encoding process, and outputs encoded information corresponding to the hash value in the reference hash list.

According to the semiconductor device, it is possible to skip the encoding based on prediction, when the same images are successively input.

DETAILED DESCRIPTION

Figure 1:
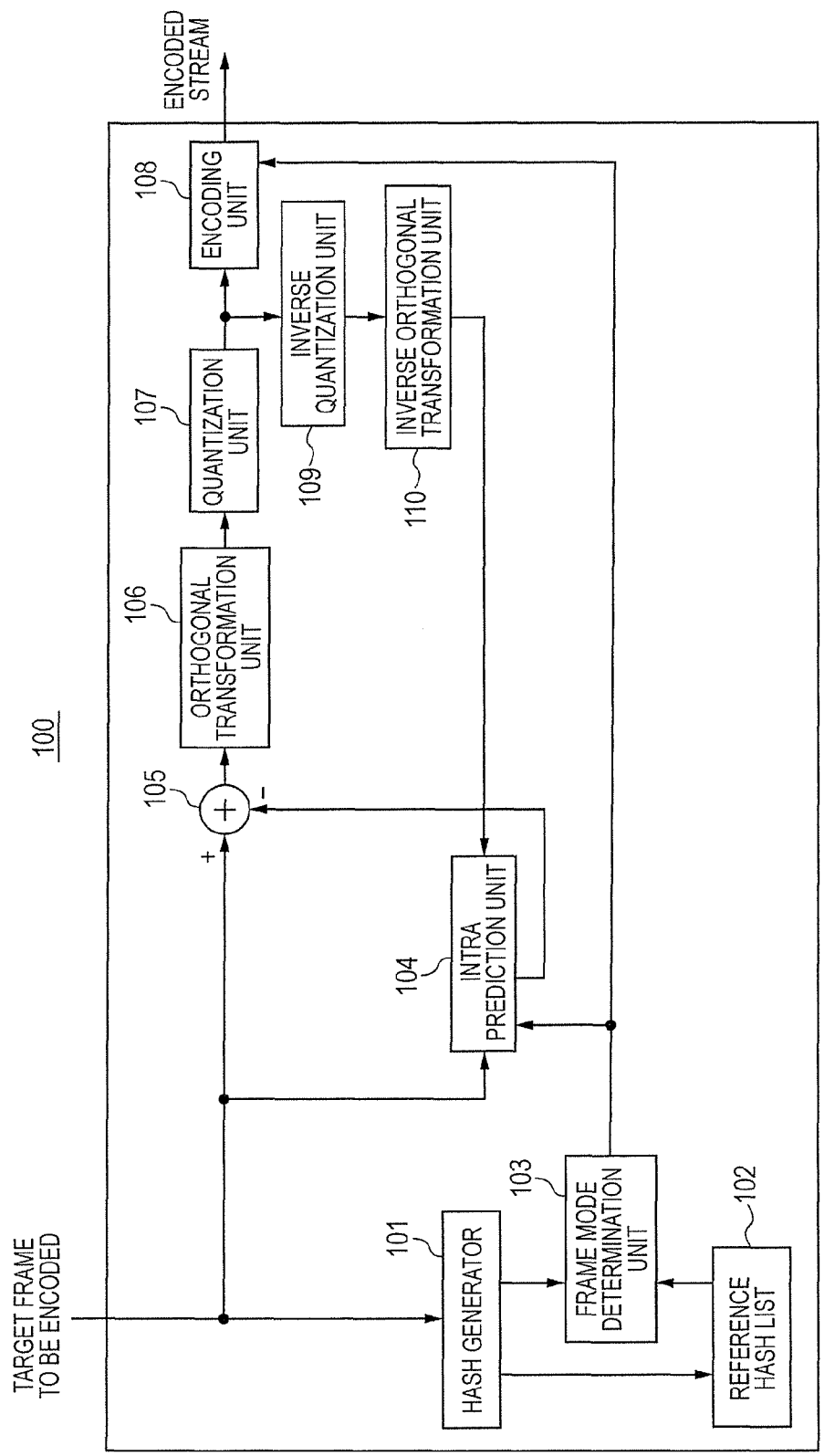
FIG. 1 is a block diagram illustrating a configuration of an image encoding apparatus according to an embodiment 1.

Preferred embodiments and modifications of the present invention will now be described using the accompanying drawings. In the following descriptions, the same constituent elements are given with the same reference numerals, and thus will not repeatedly be described over and over.

The motion image encoding, for example, H.264 and H.265, provides an I frame, a P frame, and a B frame. The I frame is for prediction only using intra frame encoding, the P frame is for inter frame prediction from one or more encoded image data item, and the B frame is for bi-directionally inter frame prediction from two or more encoded image data items. In general, in the encoding efficiency, the relationship of "I frame"<"P frame"<"B frame" is made. As the number of reference frames is large, problems remain in a physical memory amount (capacity of the frame memory), a transfer amount of pixel data of a reference image, and a calculation amount for motion detection.

Comparative Example

Descriptions will now be made to a technique (hereinafter referred to as a comparative example) examined by the present inventors, prior to the present disclosure.

Figure 13:
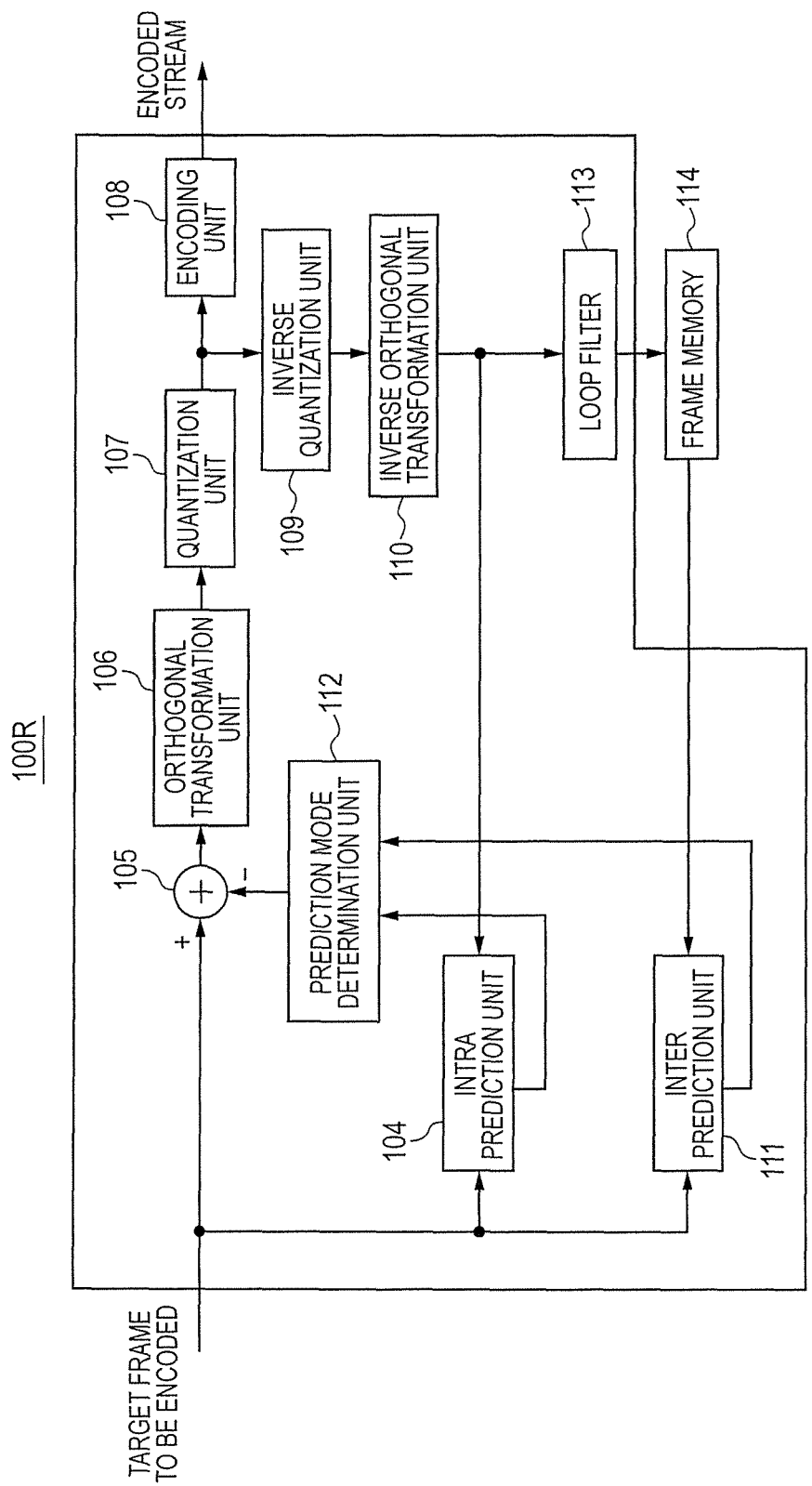
FIG. 13 is a block diagram illustrating a configuration of an image encoding apparatus according to a comparative example 1.

FIG. 13 is a block diagram illustrating a configuration of an image encoding apparatus according to a comparative example 1. An encoding apparatus 100R includes an intra prediction unit 104, a subtracter 105, an orthogonal transformation unit 106, a quantization unit 107, an encoding unit 108, an inverse quantization unit 109, an inverse orthogonal transformation unit 110, an inter prediction unit 111, a prediction mode determination unit 112, a loop filter 113, and a frame memory 114. The intra prediction unit 104 generates a prediction image from pixels around a target block to be encoded, and generates intra prediction image data and an intra prediction error value. The subtracter 105 calculates a difference in prediction image data, which is generated from original image data and encoded image data. The orthogonal transformation unit 106 transforms difference data calculated by the subtracter 105, to a frequency domain. The quantization unit 107 quantizes the data transformed to the frequency domain by the orthogonal transformation unit 106. The encoding unit 108 transforms the data quantized by the quantization unit 107 into a variable length code. The inverse quantization unit 109 inverse-quantizes the data quantized by the quantization unit 107. The inverse orthogonal transformation unit 110 performs inverse orthogonal transform of the data inverse-quantized by the inverse quantization unit 109. The inter prediction unit 111 performs inter frame prediction for a target frame to be encoded and reference image data accumulated in the frame memory 114, and reads reference image data nearest to the original image data from the frame memory 114, based on motion vectors generated by motion detection, to generate inter prediction image data and an inter prediction error value. The prediction mode determination unit 112 compares the inter prediction error generated by the inter prediction unit 111 with the intra prediction error generated by the intra prediction unit 104, selects the smaller error therefrom as an encoding mode, and selects the prediction error data of the selected mode as a selection prediction error. The loop filter 113 performs a filter process for the data which is inversely orthogonally transformed by the inverse orthogonal transformation unit 110. The frame memory 114 accumulates decoded image data which has been filtered by the loop filter 113 as a reference frame.

Figure 15:
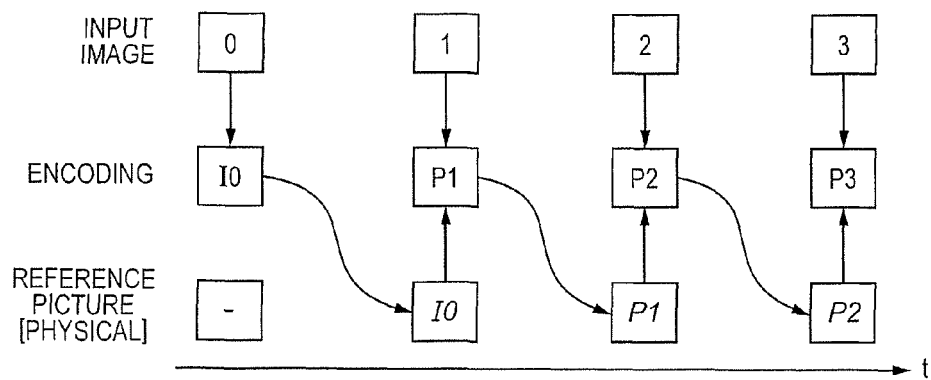
FIG. 15 is an image diagram of an encoding operation of the image encoding apparatus of FIG. 13.

FIG. 15 is an image diagram of an encoding operation of the image encoding apparatus of FIG. 13. Encoding is performed using reference image data (for example, one preceding frame) in the frame memory 114, except the first frame (input image (0)). The encoding of input image (0) is configured as an I frame for prediction using only the intra frame encoding, and the encoding of any other input image is configured as a P frame for the inter-frame prediction from the encoded image data.

The image encoding apparatus according to the comparative example 1 performs encoding always based on the intra prediction and the inter prediction, even when the same image is successively input. That is, the apparatus performs an unnecessary amount of useless processing. It is necessary to prepare a frame memory storing the reference image data.

Figure 14:
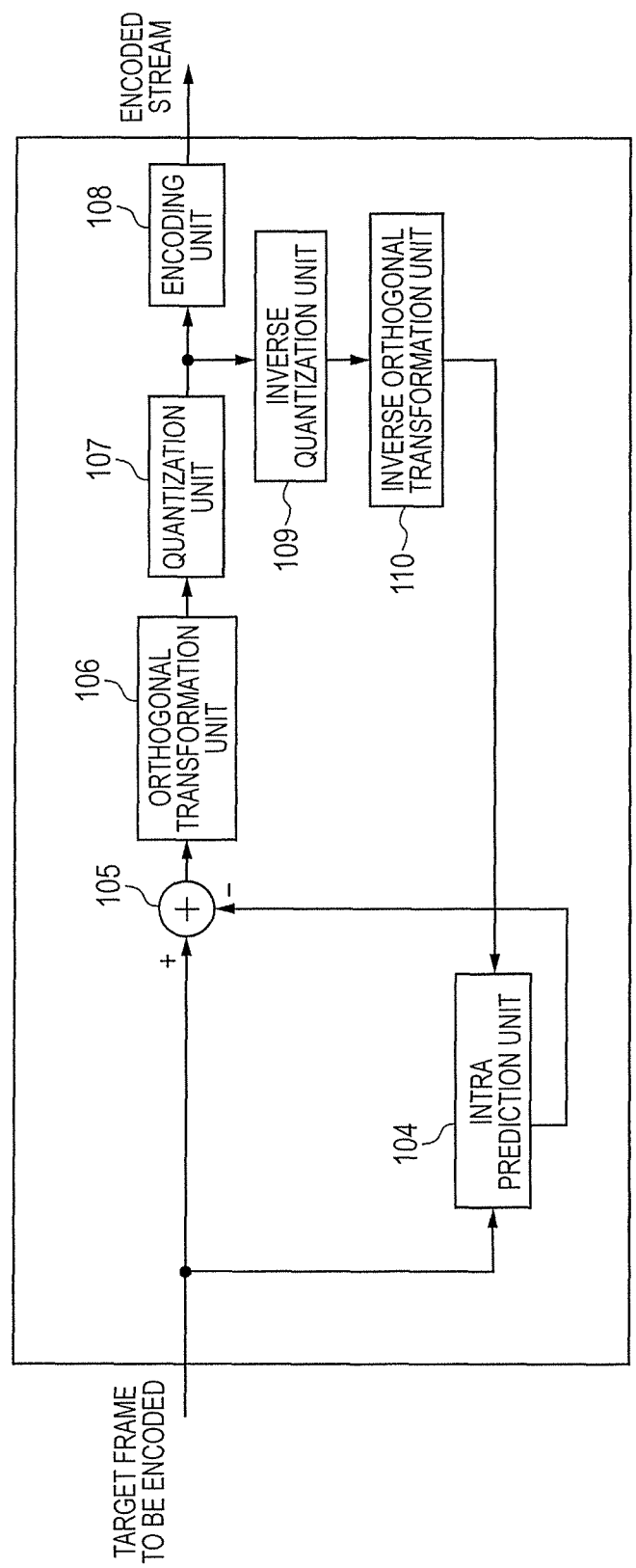
FIG. 14 is a block diagram illustrating a configuration of an image encoding apparatus according to a comparative example 2.

FIG. 14 is a block diagram illustrating a configuration of an image encoding apparatus according to a comparative example 2. An encoding apparatus 100S includes the intra prediction unit 104, the subtracter 105, the orthogonal transformation unit 106, the quantization unit 107, the encoding unit 108, the inverse quantization unit 109, and the inverse orthogonal transformation unit 110. The apparatus does not include the inter prediction unit 111, the prediction mode determination unit 112, the loop filter 113, and the frame memory 114.

The image encoding apparatus according to the comparative example 2 performs encoding always based on the intra prediction, even when the same image is successively input. That is, the apparatus performs an unnecessary amount of useless processing. Though the frame memory for storing the reference image data is not necessary, it is not possible to perform the encoding for the P frame with high efficiency, because the reference frame is not available.

EMBODIMENTS

An image encoding apparatus as a semiconductor device includes a hash generator which generates hash values of input images, and manages the hash values in the form of a reference list.

Because the hash value of an image is used in a reference list, it is possible to remarkably skip the encoding processes when the same images are input, and to reduce the consumption power and the busload. It is possible to perform the encoding for the P frame with high efficiency, without using a frame memory (including an external memory, such as an SDRAM, with large capacity) and a motion search circuit. Even when the encoding is performed with provided hash reference frames, it is possible to cope with it by simply increasing the memory for hashes, and thus enabling to suppress the memory capacity on the side of the encoding apparatus.

Embodiment 1

FIG. 1 is a block diagram illustrating a configuration of an image encoding apparatus according to the embodiment 1. A semiconductor device 100 as an encoding apparatus includes, over one semiconductor substrate, a hash generator 101, a reference hash list 102, a frame mode determination unit 103, the intra prediction unit 104, the subtracter 105, the orthogonal transformation unit 106, the quantization unit 107, the encoding unit 108, the inverse quantization unit 109, and the inverse orthogonal transformation unit 110. The hash generator 101, the reference hash list 102, and the frame mode determination unit 103 are formed over the one semiconductor substrate. The frame mode determination unit 103, the intra prediction unit 104, the subtracter 105, the orthogonal transformation unit 106, the quantization unit 107, the encoding unit 108, the inverse quantization unit 109, and the inverse orthogonal transformation unit 110 are formed over another semiconductor substrate.

The hash generator 101 generates a hash value of a target frame to be encoded. The hash value is a value with a fixed length and without regularity, and derived in accordance with a fixed calculation procedure from original data. The hash value has always a constant length regardless of a data amount of the original data. The same hash value is obtained always from the same data. In this embodiment, the descriptions will be made in the case in which the hash value is 16 bytes. The reference hash list 102 includes a reference frame list for storing the hash values generated by the hash generator 101. The frame mode determination unit 103 is a frame mode determination unit which compares the hash value of a current image output from the hash generator 101 with the reference hash list, to determine the frame encoding mode.

The intra prediction unit 104 generates a prediction image from pixels around a target block to be encoded, and generates intra prediction image data and an intra prediction error value. The subtracter 105 calculates a difference in prediction image data which is generated from original image data the encoded image data. The orthogonal transformation unit 106 transforms difference data calculated by the subtracter 105, to a frequency domain. The quantization unit 107 quantizes the data transformed to the frequency domain by the orthogonal transformation unit 106. The encoding unit 108 transforms the data quantized by the quantizing unit 107 into a variable length code. The inverse quantization unit 109 inverse-quantizes the data quantized by the quantization unit 107. The inverse orthogonal transformation unit 110 performs inverse orthogonal transform of the data inverse-quantized by the inverse quantization unit 109. The units of the encoding apparatus 100 are configured with a hardware circuit, but may be configured with the software which is executed by the CPU reading the programs from the memory.

Figure 2:
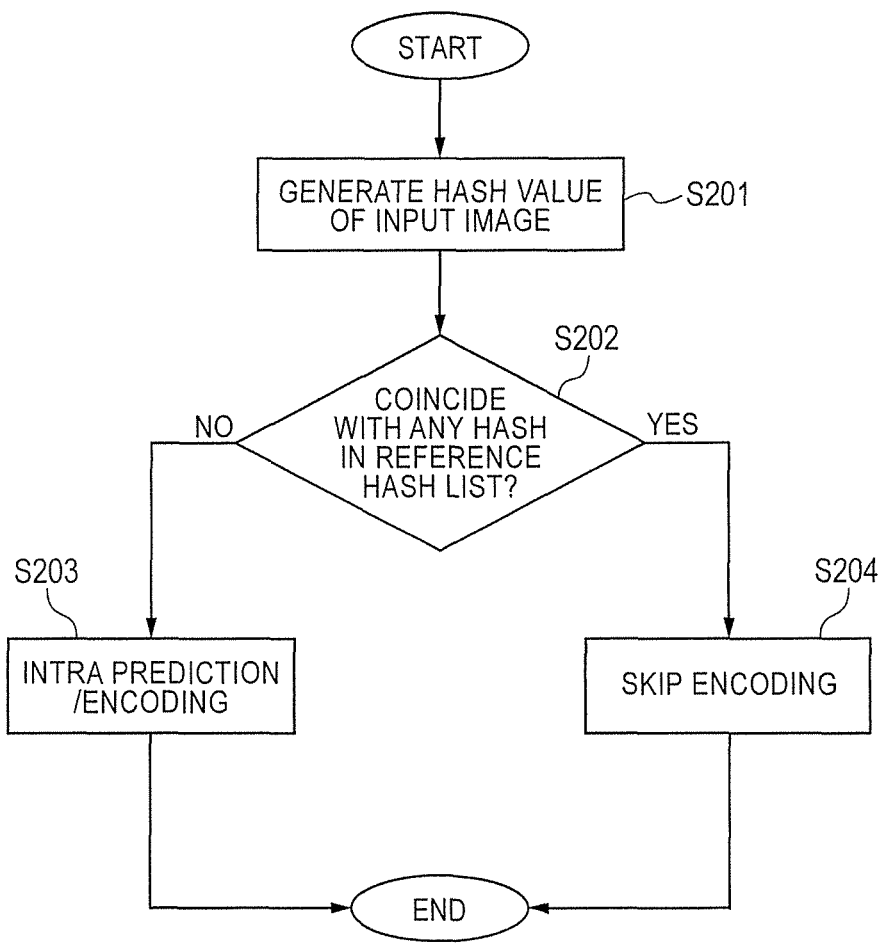
FIG. 2 is a flowchart illustrating the flow of an encoding mode determination process of the image encoding apparatus of FIG. 1.
Figure 3:
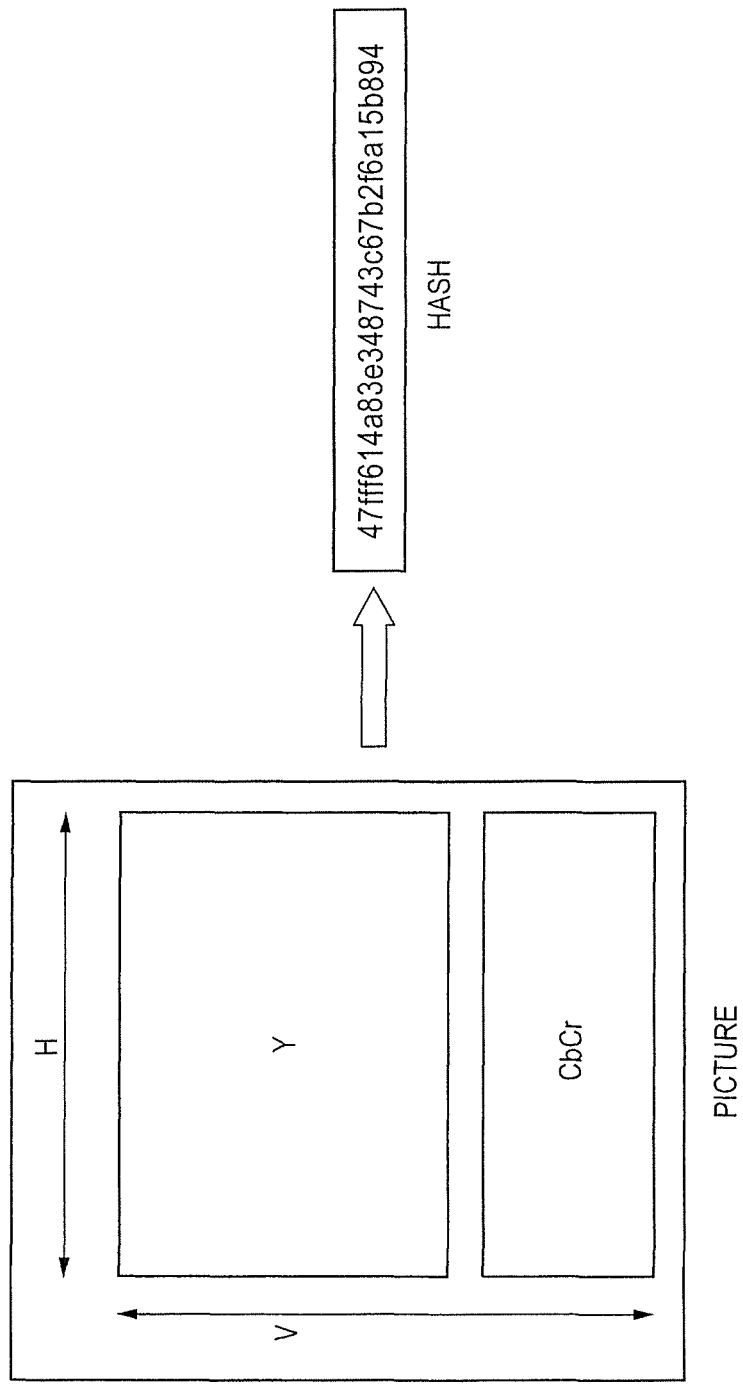
FIG. 3 is a diagram illustrating a hash-generating example of the image encoding apparatus of FIG. 1.
Figure 4:
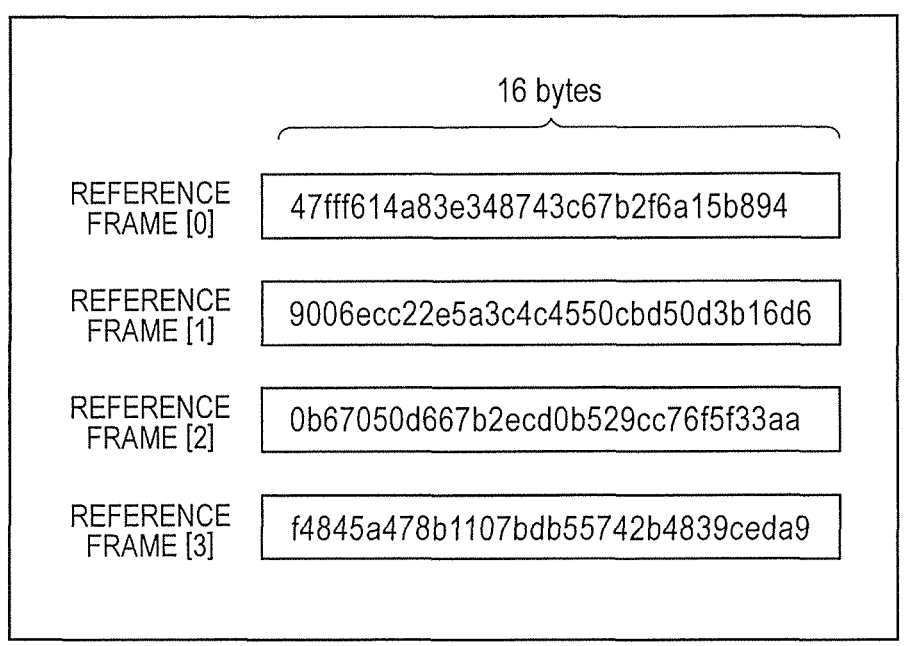
FIG. 4 is a diagram illustrating the relationship between a reference frame list and hashes of the image encoding apparatus of FIG. 1.
Figure 16:
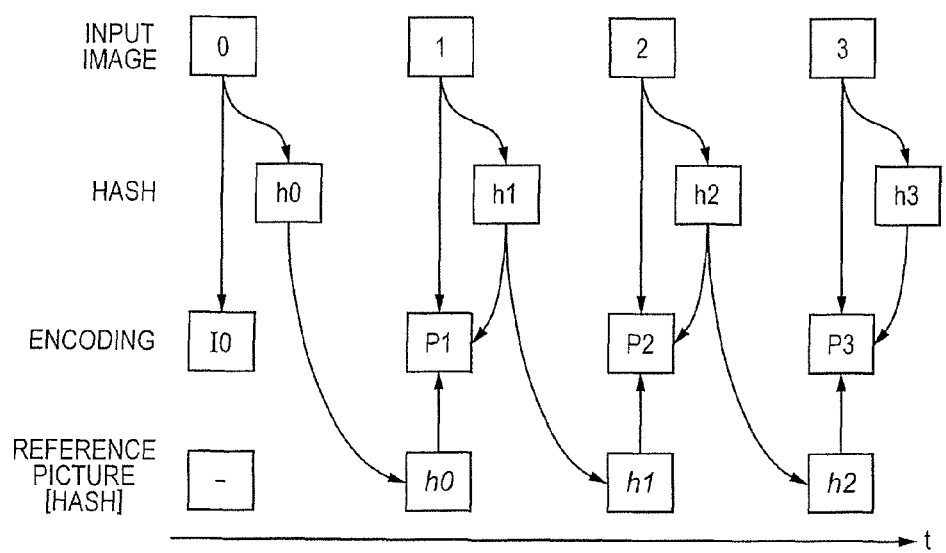
FIG. 16 is an image diagram of an encoding operation of the image encoding apparatus of FIG. 1.
Figure 17:
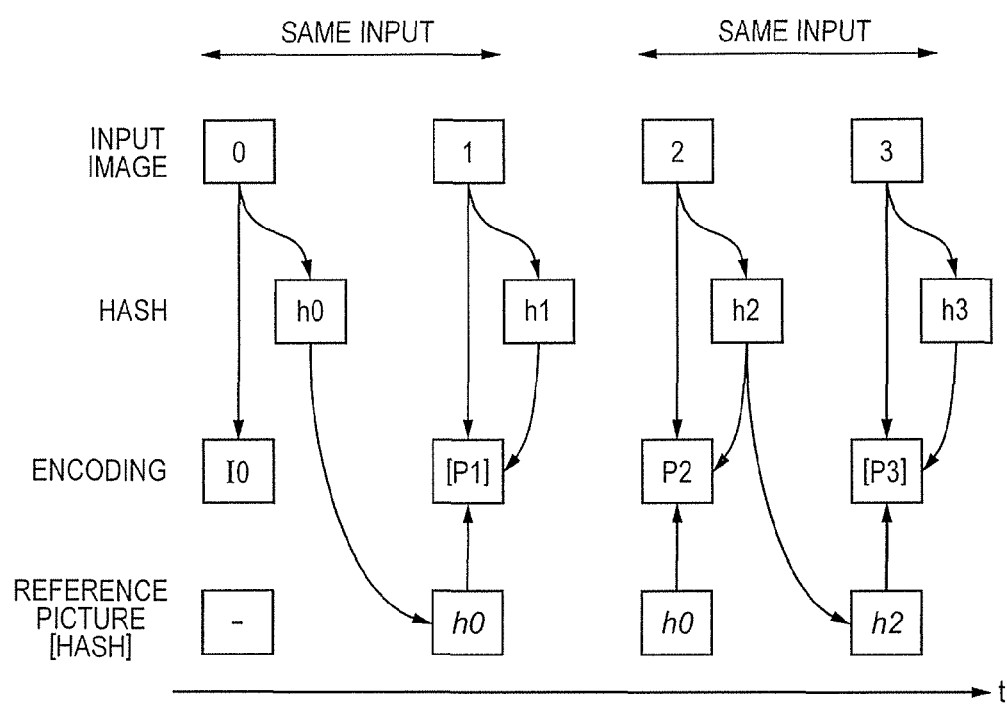
FIG. 17 is an image diagram of an encoding operation of the image encoding apparatus of FIG. 1.

FIG. 2 is a flowchart diagram illustrating the flow of an encoding mode determination process of the encoding apparatus of FIG. 1. FIG. 3 is a diagram illustrating a hash-generating example of the image encoding apparatus of FIG. 1. FIG. 4 is a diagram illustrating the relationship between the reference frame list of the image encoding apparatus of FIG. 1 and the hashes. FIG. 16 is an image diagram of an encoding operation of the image encoding apparatus of FIG. 1. FIG. 17 is an image diagram for explaining updating of the reference hash list of the image encoding apparatus of FIG. 1.

The flow of the encoding mode determination process will hereinafter be described using the flowchart of FIG. 2.

Step S201: The hash generator 101 calculates a hash value of an input image. As illustrated in FIG. 3, the hash generator 101 calculates a hash value (HASH) of 16 bytes, in combination of a luminance area (Y) and a color difference area (CbCr) of an input image (PICTURE). As illustrated in FIG. 4, the reference hash list 102 includes four reference frames (REFERENCE FRAME [0], REFERENCE FRAME [1], REFERENCE FRAME [2], REFERENCE FRAME [3]). The reference image list of the comparative example 1 manages addresses of a physical memory (frame memory) in association with reference frame numbers. However, in this embodiment, because the hash values are stored, the physical memory (frame memory) is not necessary. In this embodiment, the number of reference frames is four, but it is not limited to four.

Step S202: The frame mode determination unit 103 compares the hash values accumulated in the reference hash list 102 with the hash value of the current input image. When the hash value of the input image does not coincide with any of the hash values in the reference hash list 102, the flow moves to Step S203. When the hash value of the input image coincides with any of the hash values in the reference hash list 102, the flow moves to Step S204.

Step S203: The image encoding apparatus 100 performs encoding based on intra prediction. That is, the intra prediction unit 104 generates a prediction image from the pixels around the target block to be encoded, and generates intra prediction image data and an intra prediction error value. The subtracter 105 calculates a difference between the original image data and the prediction image data generated from the encoded image data. The orthogonal transformation unit 106 transforms the difference data calculated by the subtracter 105, to a frequency domain. The quantization unit 107 quantizes the data transformed to the frequency domain by the orthogonal transformation unit 106. The encoding unit 108 transforms the data quantized by the quantization unit 107 into a variable length code, and outputs a difference between the target frame to be encoded (input image) and an intra prediction image, as an encoded stream.

Step S204: Coincidence of the hash value of the input image and any of the hash values in the reference hash list 102 implies that the same image has already been received and encoded in the past. That is, totally the same image exists in the reference image list. Thus, the image encoding apparatus 100 performs encoding in a skip-encoding mode in which a reference frame represented by the coincident value is referred. Because the encoding unit 108 performs the encoding forcibly in the skip encoding mode, it is possible to skip the processes of the intra prediction unit 104, the subtracter 105, the orthogonal transformation unit 106, the quantization unit 107, the inverse quantization unit 109, and the inverse orthogonal transformation unit 110, thus enabling to stop these circuits.

As illustrated in FIG. 16, except the first frame (input image (0)), the encoding is performed using the hash value of the input image and the reference hash value (for example, the hash value of one preceding frame) in the reference hash list. The input image (0) is configured as an I frame for prediction using only the intra-frame encoding, and the encoding of any other input image is for a P frame for the inter-frame prediction using the hash value of the input image and the hash value of one preceding frame.

Descriptions will now be made to updating of the skip encoding mode and the reference hash list, using FIG. 17. FIG. 17 illustrates a case in which an input image (0) and an input image (1) are the same images, a change is made between the input image (1) and an input image (2), and the input image (2) and an input image (3) are the same images. In the input image (1), a hash (HASH) (h1) and a reference hash (REFERENCE PICTURE [HASH]) (h0) coincide with each other. Thus, the encoding (ENCODING) is performed as skip encoding ([P1]). The reference hash list remains "h0" without being updated. The reference hash list remains the same. Thus, it is rather efficient not updating it, but it may explicitly be updated. In the input image (2), a hash (h2) of the input image and the reference hash (h0) do not coincide with each other. Thus, the encoding is performed as general encoding (P2). In the reference hash list, "h0" is updated to "h2". In the input image (3), a hash (h3) and the reference hash (h2) coincide with each other. Thus, the encoding is performed using skip encoding ([P3]). The reference hash list remains as "h2" without being updated.

In this embodiment, the reference frame list is managed and includes the hash values. Thus, the high efficient P frame encoding can be performed without using the physical memory (frame memory). When the skip encoding mode is selected, it is possible to skip the processes for many blocks inside the encoding apparatus 100. Therefore, it is possible to reduce the consumption power and the busload in motion image data transfer. In this embodiment, the descriptions have been made to the case where the hash value is formed with a length of 16 bytes. However, it is not limited to 16 bytes, and an arbitrary length of the hash value is possible. In addition, an arbitrary hash value-generating algorithm (for example, MD5 algorithm, as a hash function) may be used in the hash generator.

The major feature of the embodiment 1 is that the hash generator and the reference hash list are provided, in place of the physical memory (frame memory). As a result, the high efficient P frame encoding can be realized, even without requiring the physical memory. When the reference frames are four frames, when Quad Full HD (3840×2160) size is applied, and in the case of 4:2:0 format, the capacity of the physical memory is 3840×2160×1.5×4 frames=approximately 50M bytes. In the case of 4:4:4 format of the smartphone, the capacity of the physical memory is 800×480×3 frames=approximately 1M byte. On the contrary, the capacity of the reference hash list is 16×4=48 bytes. This enables to remarkably reduce the memory capacity. Accessing is not made to the physical memory, thus enabling also to reduce the busload in the reference image data transfer.

When the skip encoding mode is selected, most circuits of the encoding apparatus can be stopped, thus enabling to remarkably reduce the consumption power. The screen contents have characteristics obviously different from the general natural image. There is a tendency that a still state of the computer-generated image keeps. When the screen contents of, for example, a smartphone screen, are transmitted using the frame of an existing motion image encoding standard, such as H.264, it is effective to apply the skip encoding mode.

Embodiment 2

Figure 5:
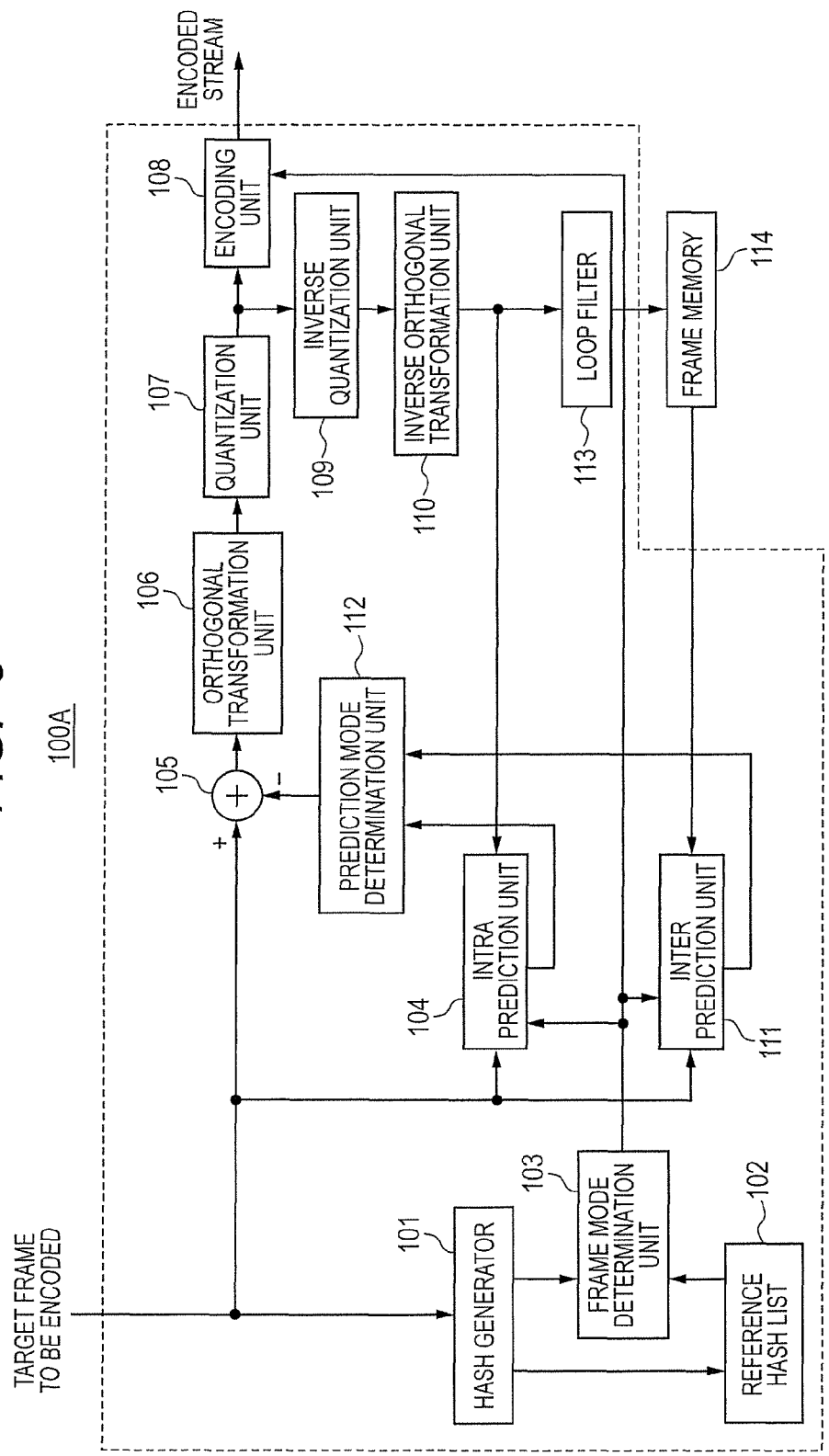
FIG. 5 is a block diagram illustrating a configuration of an image encoding apparatus according to an embodiment 2.

FIG. 5 is a block diagram illustrating a configuration of an image encoding apparatus according to an embodiment 2. A semiconductor device 100A as an encoding apparatus includes, over one semiconductor substrate, a hash generator 101, a reference hash list 102, a frame mode determination unit 103, an intra prediction unit 104, a subtracter 105, an orthogonal transformation unit 106, a quantization unit 107, an encoding unit 108, an inverse quantization unit 109, an inverse orthogonal transformation unit 110, an inter prediction unit ill, a prediction mode determination unit 112, a loop filter 113, and a frame memory 114. The frame memory 114 may be provided over another semiconductor substrate, and the semiconductor device 100A may be configured with a plurality of semiconductor substrates. The semiconductor device 100A may be configured with a SiP (System in Package) in which a plurality of semiconductor substrates are sealed in one package.

The inter prediction unit 111 performs inter-frame prediction for a target frame to be encoded and reference image data accumulated in the frame memory 114, and reads reference image data nearest to original image data from the frame memory, based on motion vectors generated by motion detection, to generate inter prediction image data and an inter prediction error value. The prediction mode determination unit 112 compares an inter prediction error generated by the inter prediction unit 111 with an intra prediction error generated by the intra prediction unit 104, selects the smaller error therefrom as an encoding mode, and selects the prediction error data of the selected encoding mode as a selection prediction error. The loop filter 113 performs a filter process for the data which is inversely orthogonally transformed by the inverse orthogonal transformation unit 110. The frame memory 114 accumulates decoded image data which is inversely orthogonally transformed by the loop filter 113 as a reference frame.

Figure 6:
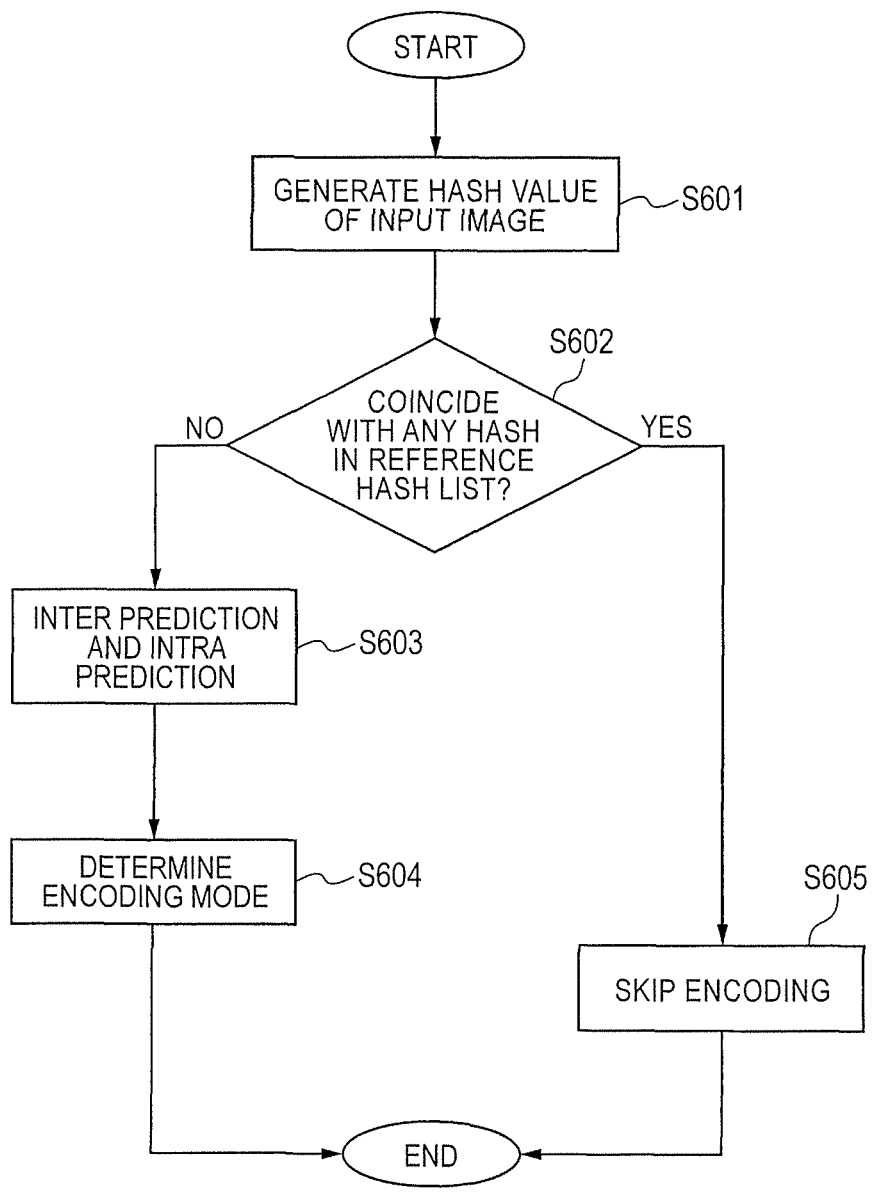
FIG. 6 is a flowchart illustrating the flow of an encoding mode determination process of the image encoding apparatus of FIG. 5.

FIG. 6 is a flowchart illustrating the flow of an encoding mode determination process of the image encoding apparatus of FIG. 5.

Figure 7:
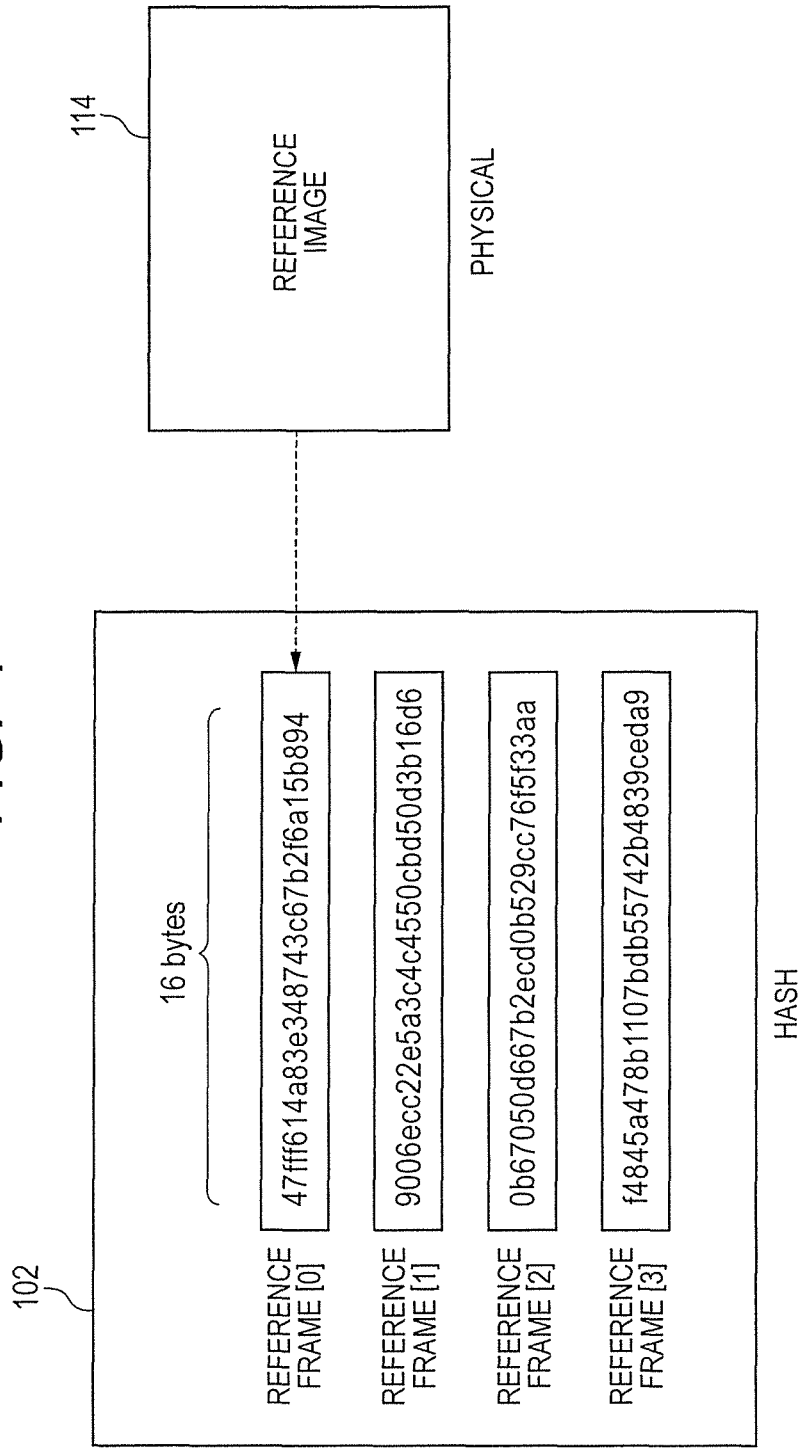
FIG. 7 is a diagram illustrating the relationship between a reference frame list and hashes of the image encoding apparatus of FIG. 5.

Step S601: The hash generator 101 calculates a hash value of an input image. In this embodiment, as illustrated in FIG. 3, the hash generator 101 calculates a hash value (HASH) of 16 bytes, in combination of a luminance area (Y) and a color difference area (CbCr) of an input image (PICTURE). As illustrated in FIG. 7, like the embodiment 1, the reference hash list 102 includes four reference frames (REFERENCE FRAME [0], REFERENCE FRAME [1], REFERENCE FRAME [2], REFERENCE FRAME [3]). One frame of the four reference frames is assigned with a physical memory (frame memory). That is, one frame of reference image data corresponding to the reference hash value in the reference hash list 102 is stored in the frame memory 114.

Step S602: The frame mode determination unit 103 compares a hash value accumulated in the reference hash list 102 with a hash value of the current input image. When the hash value in the reference list does not coincide with the hash value of the input image, the flow moves to Step S603. When the hash value in the reference hash list coincides with the hash value of the current input image, the flow moves to Step S605.

Step S603: Like Step S203 of the embodiment 1, the intra prediction unit 104 generates intra prediction image data and an intra prediction error value. The inter prediction unit 111 performs inter prediction for a target frame to be encoded and reference image data accumulated in the frame memory 114, and reads reference image data nearest to the original image data from the frame memory based on motion vectors generated by motion detection, to generate inter prediction image data and an inter prediction error value.

Step S604: The prediction mode determination unit 112 compares the inter prediction error with an intra prediction error, and selects the smaller prediction error as an encoding mode. That is, the prediction mode determination unit 112 selects the lower encoding cost as an encoding mode. The image encoding apparatus 100A performs encoding based on the selected encoding mode. That is, the image encoding apparatus 100A performs encoding based on intra prediction and inter prediction. The encoding based on the intra prediction or the inter prediction is the same as that of Step S203 of the embodiment 1.

Step S605: Like Step S204 of the embodiment 1, the skip encoding is performed. It is possible to skip the processes of the intra prediction unit 104, the subtracter 105, the orthogonal transformation unit 106, the quantization unit 107, the inverse quantization unit 109, the inter prediction unit 111, the prediction mode determination unit 112, and the loop filter 113, and to stop these circuits.

In this embodiment, the descriptions have been made to the one physical reference frame, of the four hash reference frames. However, it is not limited to this example. It is possible to assign an arbitrary number of physical reference frames and an arbitrary number of hash reference frames.

The major feature of the embodiment 2 is that the physical reference frame is added to the embodiment 1, thereby enabling to apply both of the hash value and the physical reference frame for prediction. As a result, when a lot of the same images are input, the hash values coincide with each other, thus enabling to remarkably skip the encoding process. When only a few same images are input, the general intra prediction and the inter prediction are performed, thereby enabling to suppress image deterioration.

Modification

Figure 8:
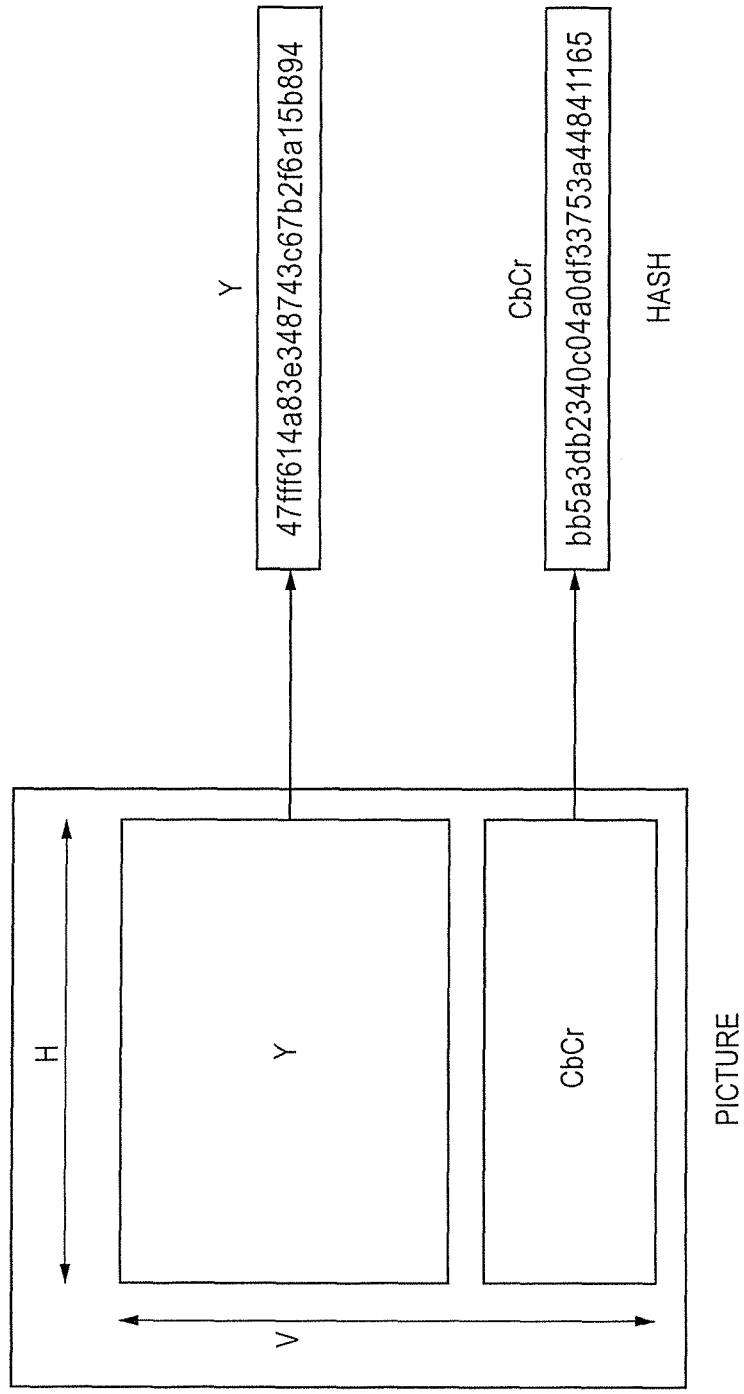
FIG. 8 is a diagram illustrating a hash-generating example of an image encoding apparatus according to a modification 1.
Figure 9:
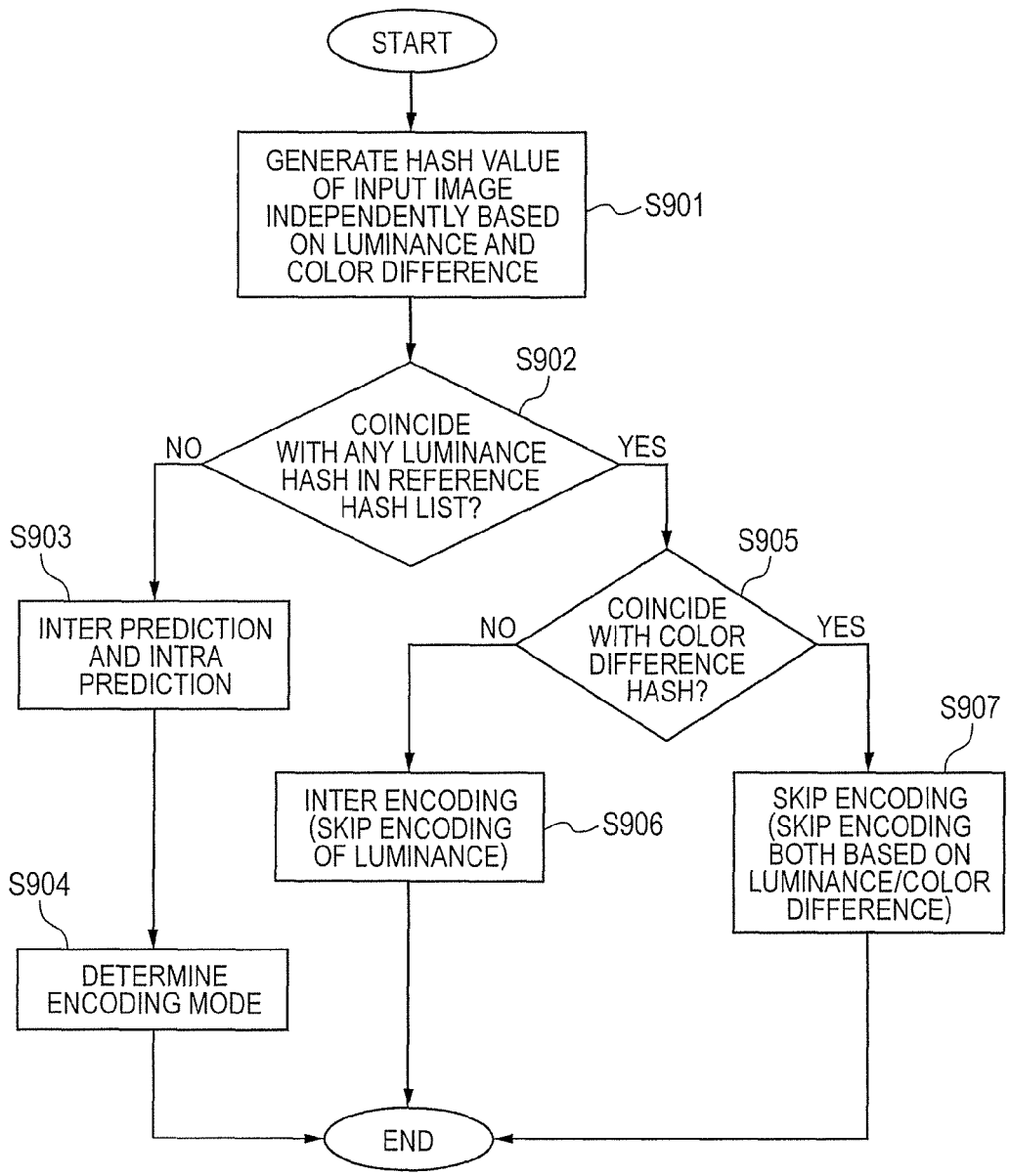
FIG. 9 is a flowchart illustrating the flow of an encoding mode determination process of the image encoding apparatus according to the modification 1.

FIG. 8 is a diagram illustrating a hash-generating example of an image encoding apparatus according to a modification 1. FIG. 9 is a flow chart illustrating the flow of an encoding mode determination process of the image encoding apparatus according to the modification 1.

Step S901: A hash generator 101 calculates hash values of an input image, in association with the luminance and the color difference. As illustrated in FIG. 8, the hash values (HASH) are generated, in association with a luminance area (Y) and a color difference area (CbCr). In the modification 1, as illustrated in FIG. 7, the reference hash list 102 includes four reference frames (REFERENCE FRAME [0], REFERENCE FRAME [1], REFERENCE FRAME [2], REFERENCE FRAME [3]).

Step S902: A frame mode determination unit 103 compares any of hash values of the luminance which are accumulated in a reference hash list 102 and a hash value of the luminance of the current input image. When any of the luminance hashes in the reference hash list 102 does not coincide with the hash value of the luminance of the current input image, the flow moves to Step S903. When any of the luminance hash values in the reference hash list 102 coincides with the luminance hash value of the current input image, the flow moves to Step S905.

Step S903: Like Step S603 of the embodiment 2, the image encoding apparatus according to the modification 1 performs intra prediction and inter prediction.

Step S904: A prediction mode determination unit 112 selects the lower encoding cost as an encoding mode, like Step S604 of the embodiment 2.

Step S905: A frame mode determination unit 103 compares the hash values of the color difference which are accumulated in the reference hash list 102 with the hash value of the color difference of the current input image. When any of the hash values of the color difference which are accumulated in the reference hash list 102 coincides with the hash value of the color difference of the current input image, the flow moves to Step S907. When any of the hash values of the color difference which are accumulated in the reference hash list 102 does not coincide with the hash value of the color difference of the input image, the flow moves to Step S906.

Step S906: Because the encoding of the luminance can be skipped, the inter prediction of the color difference is encoded, the reference image data of the luminance is prevented from being read from the frame memory 114, and only the difference of the color differences is encoded.

Step S907: The image encoding apparatus according to the embodiment 1 performs skip encoding, like Step 605 of the embodiment 2.

The major feature of the modification 1 is that hash values are generated independently in accordance with the unit of the luminance or the color difference, in addition to the embodiment 2, thereby enabling to efficiently handle any of the cases in which the hash values of only the luminance coincide with each other. As a result, when the hash values of only the luminance coincide with each other, it is possible to prevent accesses to the reference image data of the luminance in the frame memory 114, and it is also possible to allow accesses only to the reference image data of the color difference. Even when the pixel values in the frame do not coincide with each other, it is possible to skip a part of the encoding processes. In the modification 1, the hash values are generated independently in accordance with the generation units, in association with the luminance and the color difference, but are not limited to this.

Figure 10:
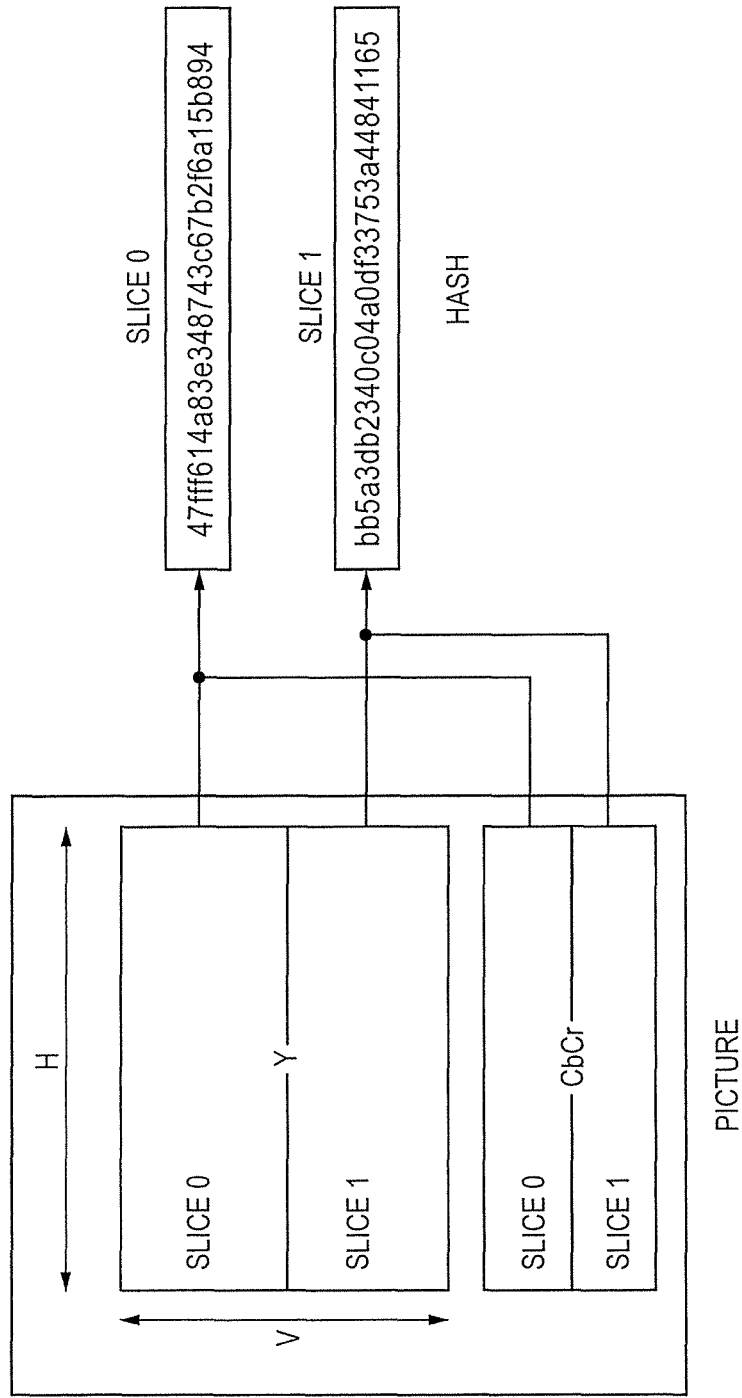
FIG. 10 is a diagram illustrating a hash-generating example of an image encoding apparatus according to a modification 2.

FIG. 10 is a diagram illustrating a hash-generating example of the image encoding apparatus according to a modification 2. A hash generator 101 of the image encoding apparatus according to the modification 2 generates and manages hash values of an input image in the unit of slice (SLICE[0], SLICE[1]) as the encoding unit of H.264. It is possible to assign an arbitrary number of physical reference frames and an arbitrary number of hash reference frames. In the modification 2, like the modification 1, it is possible to lower the access amount of the reference data in the frame memory, and it is possible to skip a part of the encoding processes even when the pixel values in the frame do not entirely coincide with each other.

Figure 11:
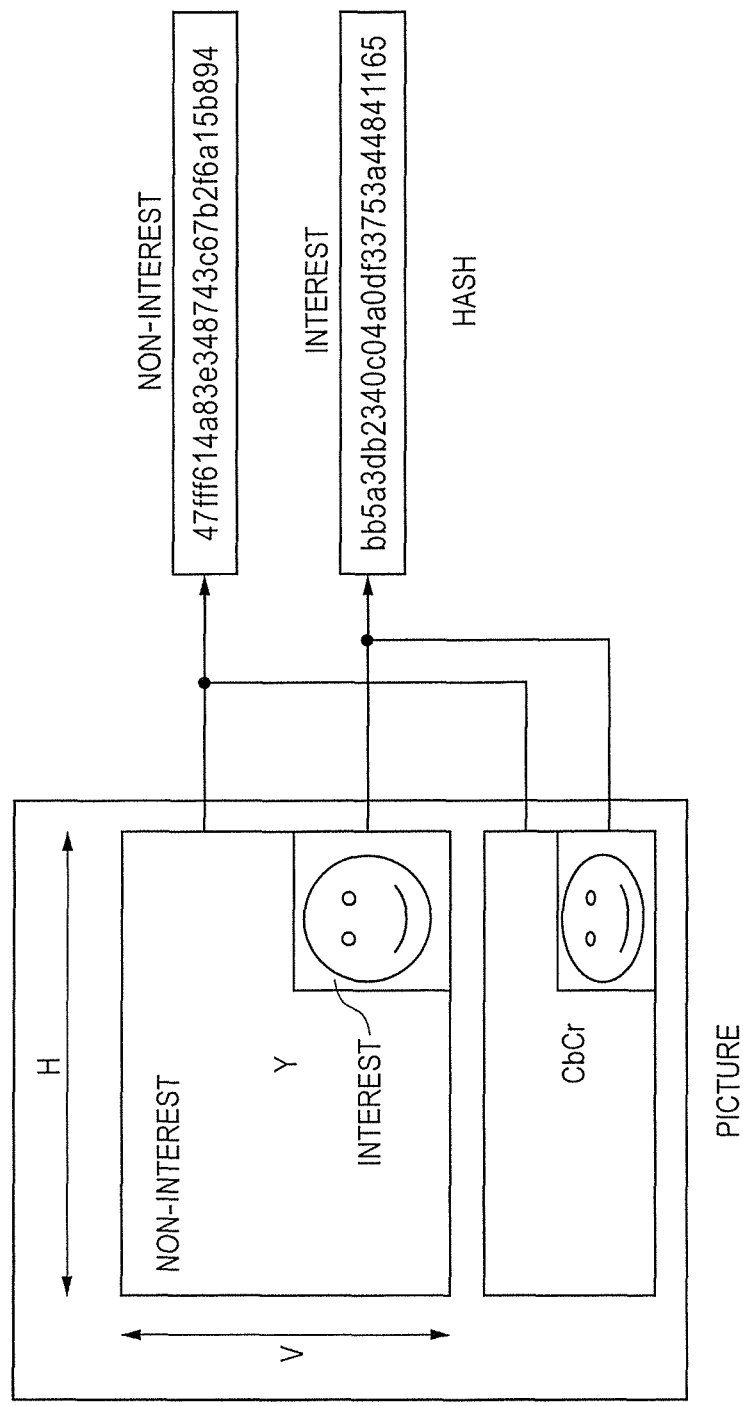
FIG. 11 is a diagram illustrating a hash-generating example of an image encoding apparatus according to a modification 3.

FIG. 11 is a diagram illustrating a hash-generating example of an image encoding apparatus according to a modification 3. The hash generator 101 of the image encoding apparatus according to the modification 3 generates the hash values separately between a region of interest (INTEREST) and a region of non-interest of an input image. Like the modification 1, in the modification 3, it is possible to lower the access amount of the reference data in the frame memory, and it is possible to skip a part of the encoding processes even when the pixel values of the frame do not entirely coincide with each other.

Embodiment 3

Figure 12:
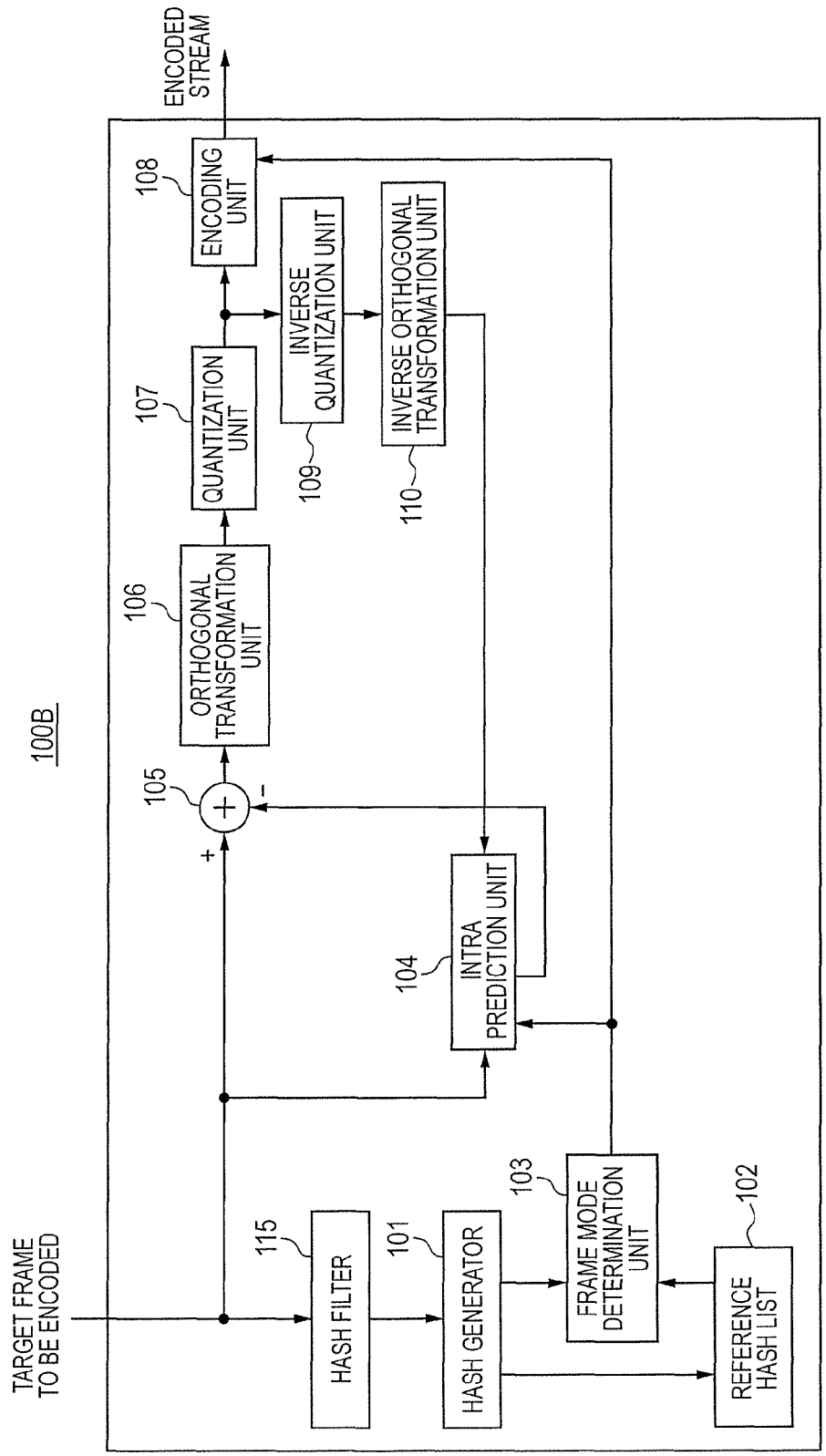
FIG. 12 is a block diagram illustrating a configuration of the image encoding apparatus according to the modification 3.

FIG. 12 is a block diagram illustrating a configuration of an image encoding apparatus according to an embodiment 3. A semiconductor device 100B as an encoding apparatus includes, over a semiconductor substrate, a hash generator 101, a reference hash list 102, a frame mode determination unit 103, an intra prediction unit 104, a subtracter 105, an orthogonal transformation unit 106, a quantization unit 107, an encoding unit 108, an inverse quantization unit 109, an inverse orthogonal transformation unit 110, and a hash filter 115. The hash filter 115 smoothes a target frame to be encoded, and is to improve the generation probability of the same hash. In the embodiment 3, the hash filter 115 is provided preceding the hash generator 101 of the embodiment 1. However, the hash filter 115 may be provided preceding the hash generator 101 of the modification.

Due to the characteristic of the hash value, different hash values are generated, even if there is a one-bit difference in the inputs to the hash function. For example, a minute noise is superimposed over an input image, different hashes are undesirably generated, and it is difficult to attain totally the same hashes. In the hash filter 115, the input image is smoothed, and the minute noise is eliminated, thereby enabling to improve the probability of generating the same hash values. The hash filter 115 may be a bit mask which ignores the lower bits, may perform quantization, or may be a low pass filter or a noise elimination filter.

The major feature of the embodiment 3 is that the hash filter is provided, thereby enabling to control generation of the hash values. As a result, even if the minute noise is superimposed over the input image, it is possible to prevent generation of different hash values due to the noise, and it is also possible to improve the encoding efficiency.

Accordingly, the inventions of the present inventors have concretely been described based on the embodiments and modifications. However, the present invention is not limited to the embodiments and modifications, and, needless to say, various changes may possibly be made.

What is claimed is:
1. A semiconductor device comprising:
    a hash generator which generates a hash value of a target frame to be encoded;
    a reference hash list for recording the hash value generated by the hash generator;
    a frame mode generation unit which compares the hash value generated by the hash generator with any of hash values in the reference hash list; and
    an intra prediction unit which performs intra-frame prediction for the target frame to be encoded,
    wherein, when the hash value of the target frame to be encoded coincides with any of the hash values in the reference hash list, the intra prediction unit skips an encoding process, and outputs encoded information corresponding to any of the hash values in the reference hash list.
2. The semiconductor device according to claim 1,
    wherein, when the hash value of the target frame to be encoded does not coincide with any of the hash values of the reference hash list, the intra prediction unit performs intra-frame prediction.

3. The semiconductor device according to claim 2, further comprising
an inter prediction unit; and
a frame memory which stores a physical reference frame,
wherein, when the hash value of the target frame to be encoded does not coincide with any of the hash values in the reference hash list, the inter prediction unit performs inter-frame prediction using the physical reference frame.

4. The semiconductor device according to claim 3, further comprising
a prediction mode determination unit which compares an inter prediction error generated by the inter prediction unit with an intra prediction error generated by the intra prediction unit, selects a lower prediction error as an encoding mode, and selects prediction error data of the selected mode as an selection prediction error.

5. The semiconductor device according to claim 1, wherein the hash generator generates hash values, independently in accordance with generation units of the hash values, either in association with luminance and color differences, in association with encoding units of slice, or in association with a region of interest and a region of non-interest.

6. The semiconductor device according to claim 1, further comprising
a hash filter which smoothes the target frame to be encoded, preceding the hash generator.

7. The semiconductor device according to clam 1, wherein the hash generator, the reference hash list, the frame mode determination unit, and the intra prediction unit are formed over one semiconductor substrate.

8. The semiconductor device according to claim 3, wherein the hash generator, the reference hash list, the frame mode determination unit, the intra prediction unit, and the inter prediction unit are formed over one semiconductor substrate, and
wherein the physical reference memory is formed over a semiconductor substrate which is different from the semiconductor substrate.

9. The semiconductor device according to claim 1, further comprising:
a subtracter which calculates a difference in prediction image data, which is generated from image data of the target frame to be encoded and encoded image data;
an orthogonal transformation unit which transforms difference data calculated by the subtracter to a frequency domain;
a quantization unit which quantizes the data transformed to the frequency domain by the orthogonal transformation unit;
an encoding unit which transforms the data quantized by the quantization unit into a variable length code;
an inverse quantization unit which inverse-quantizes the data quantized by the quantization unit; and
an inverse orthogonal transformation unit which performs inverse orthogonal transform of the data inverse-quantized by the inverse quantization unit,
wherein, when the hash value of the target frame to be encoded coincides with any of the hash values in the reference hash list, processes of the subtracter, the orthogonal transformation unit, the quantization unit, the inverse quantization unit, and the inverse orthogonal transformation unit are stopped.

10. An image encoding method comprising the steps of:
(a) generating a hash value of a target frame to be encoded;
(b) recording a hash value in a reference hash list;
(c) comparing the hash value generated in the step (a) with the hash value recorded in the step (b);
(d) when the hash values do not coincide with each other in the step (c), performing intra-frame prediction for the target frame to be encoded; and
(e) after the step (d), when the hash values coincide with each other in the step (c), skipping an encoding process, and outputting encoded information corresponding to any of hash values in the reference hash list.

11. The image encoding method according to claim 10, further comprising the step of
(f) when the hash values coincide do not coincide with each other, performing inter-frame prediction for the target frame to be encoded.

12. The image encoding method according to claim 11, further comprising the step of
(g) comparing an inter prediction error generated in the step (f) with an intra-prediction error generated in the step (d), selecting a lower prediction error as an encoding mode, and selecting prediction error data of the selected mode as a selection prediction error.

13. The image encoding method according to claim 10, wherein the step (a) includes a step of generating the hash values, independently in accordance with generation units of the hash values, either in association with luminance and color differences, in association with encoding units of slice, or in association with a region of interest and a region of non-interest.

14. The image encoding method according to claim 10, further comprising the step of
(h) smoothing the target frame to be encoded, before the step (a).

15. The image encoding method according to claim 10, wherein the step (e) includes a step of stopping a subtracting process, an orthogonal transformation process, a quantization process, an inverse quantization process, and an inverse orthogonal transformation process.

* * * * *